(12) United States Patent
Takahashi et al.

(10) Patent No.: US 7,504,946 B2
(45) Date of Patent: Mar. 17, 2009

(54) MAGNETIC MATERIAL SENSING DEVICE, MAGNETIC MATERIAL SENSING METHOD, AND IMAGE FORMING APPARATUS

(75) Inventors: Kunihiro Takahashi, Kanagawa (JP); Mario Fuse, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 443 days.

(21) Appl. No.: 11/295,438

(22) Filed: Dec. 7, 2005

(65) Prior Publication Data

US 2006/0187036 A1      Aug. 24, 2006

(30) Foreign Application Priority Data

Feb. 18, 2005   (JP) .............................. 2005-042676

(51) Int. Cl.
   *G08B 13/14* (2006.01)
(52) U.S. Cl. .............. 340/572.1; 340/572.2; 340/568.1; 340/567
(58) Field of Classification Search ... 340/572.1–572.9, 340/568.1, 568.2, 568.8, 561, 567
   See application file for complete search history.

(56) References Cited

U.S. PATENT DOCUMENTS

| | | | | |
|---|---|---|---|---|
| 3,911,389 A | * | 10/1975 | Mills ........................... | 340/941 |
| 5,717,381 A | * | 2/1998 | Jagielinski et al. .......... | 340/551 |
| 5,987,269 A | * | 11/1999 | Allen et al. ................... | 399/27 |
| 6,409,329 B1 | * | 6/2002 | King ........................... | 347/102 |
| 6,993,262 B2 | * | 1/2006 | Nezu ........................... | 399/33 |

FOREIGN PATENT DOCUMENTS

| JP | | 11-025369 | * | 1/1999 |
|---|---|---|---|---|
| JP | A | 11-025369 | | 1/1999 |

* cited by examiner

*Primary Examiner*—Daniel Previl
(74) *Attorney, Agent, or Firm*—Oliff & Berridge, PLC

(57) ABSTRACT

A magnetic material sensing device which senses a magnetic material by detecting a signal which the magnetic material emits when an alternating magnetic field is applied, the magnetic material sensing device includes: an exciting coil which applies the alternating magnetic field; a receiving coil which receives a first signal which is generated due to the alternating magnetic field; a noise signal removing part that removes, from the first signal, a noise signal of an object which reflects the alternating magnetic field; and a detecting part that detects, from the noise signal-removed signal, the signal emitted from the magnetic material.

16 Claims, 10 Drawing Sheets

MAGNETIC MATERIAL SENSING DEVICE, MAGNETIC MATERIAL SENSING METHOD, AND IMAGE FORMING APPARATUS

BACKGROUND OF THE INVENTION

1. Field of the Invention

The present invention relates to a magnetic material sensing device, a magnetic material sensing method and an image forming apparatus that sense a magnetic material by detecting a signal emitted from the magnetic material which is placed in an alternating magnetic field, and more particularly to a magnetic material sensing device, a magnetic material sensing method and an image forming apparatus having high reliability that, even if a metallic structure is present near a sending coil for sending an alternating magnetic field and a receiving coil for receiving a signal emitted from the magnetic material, can sense surely a signal emitted from the magnetic material by eliminating an influence of the metallic structure.

2. Description of the Related Art

In recent years, there are provided various processes and devices to enhance security for prevention of leakage of confidential information, personal information and the like, prevention of counterfeiting of valuable securities and the like, and theft-prevention of commodities and the like.

For example, for stores and shops where commodities such as various products are sold, there is provided a system capable of preventing commodities from being stolen by fixing a tag to commodities to prevent them from being stolen, and sensing the state of the tag by ON/OFF of 1 bit when a commodity with the tag passes through a gate by a gate-shaped tag sensing apparatus which is installed at the exit so as to judge whether or not the payment for that commodity has been done.

Types of tags used are an RFID (Radio Frequency Identification) tag, a magnetic tag using a magnetic material and the like. And, there are also provided various types of tag sensing devices capable of accurately sensing such tags from a distance near to or far from the tags.

For example, there is a known device for sensing a tag made of a magnetic material. It is configured that a sending coil to which a prescribed exciting signal is applied and a receiving coil which detects a magnetic field are disposed to face each other, and when the tag having the magnetic material moves between the two coils, a change in magnetic flux density caused in the tag by the magnetic field from the sending coil is detected by the receiving coil, it is judged under prescribed conditions that the magnetic field is from the tag, and it is judged that the tag is moving, namely a commodity with the tag is moving, thereby enabling to prevent commodities and the like from being stolen from shops and stores.

Such a device utilizing magnetism detects a signal by the receiving coil when a magnetic material other than the prescribed tag is moving. Therefore, it is important to distinguish the signal from the magnetic field generated by the prescribed tag from the signal according to the magnetic field generated by another magnetic material in order to provide a device with high reliability having a low erroneous discrimination probability and a high precise detection probability.

For example, a highly reliable tag detection method and product monitoring device with a low erroneous discrimination probability and a precise detection accuracy by enabling to extract surely only a signal which is produced due to the magnetic characteristics of a prescribed magnetic member from a tag formed of a magnetic member has been proposed.

The proposed tag detection method and product-monitoring device remove the same-phase component noise with both ends of the receiving coil used as input of a differential amplifier in order to remove exogenous noise generated in the receiving coil from the signal.

And, an S/N ratio is increased by repeating the addition of the detected signal for prescribed times to enhance the accuracy of the detected signal, and an effect of reducing signals other than the target signal detected with irregular timing is obtained by a repeated operation.

The repeated operation is performed with the detection signal digitized, so that ADC (=Analog Digital Converter), memory, CPU (=Central Processing Unit) or the like is required.

But, if a metal structure or a metal not grounded is present near the antenna, multiple reflection occurs between the antenna and the metallic structure, making it difficult to sense the signal emitted from the tag. And, if a metal not grounded is present near the antenna, it is necessary to perform signal processing in order to sense the signal emitted from the tag.

SUMMARY OF THE INVENTION

An aspect of the present invention provides a magnetic material sensing device which senses a magnetic material by detecting a signal which the magnetic material emits when an alternating magnetic field is applied, the magnetic material sensing device includes: an exciting coil which applies the alternating magnetic field; a receiving coil which receives a first signal which is generated due to the alternating magnetic field; a noise signal removing part that removes, from the first signal, a noise signal of an object which reflects the alternating magnetic field; and a detecting part that detects, from the noise signal-removed signal, the signal emitted from the magnetic material.

A further aspect of the present invention provides a magnetic material sensing method for sensing a magnetic material by detecting a signal which the magnetic material emits when an alternating magnetic field is applied, the magnetic material sensing method includes: applying the alternating magnetic field; receiving a first signal which is generated due to the alternating magnetic field; removing, from the first signal, a noise signal of an object which reflects the alternating magnetic field; and detecting, from the noise signal-removed signal, the signal emitted from the magnetic material.

A still further aspect of the present invention provides an image forming apparatus which senses a magnetic material by detecting a signal which the magnetic material emits when an alternating magnetic field is applied, the image forming apparatus includes: an exciting coil which applies the alternating magnetic field; a receiving coil which receives a first signal which is generated due to the alternating magnetic field; a noise signal removing part that removes, from the first signal, a noise signal of an object which reflects the alternating magnetic field; and a detecting part that detects, from the noise signal-removed signal, the signal emitted from the magnetic material.

BRIEF DESCRIPTION OF THE DRAWINGS

Embodiments of the present invention will be described in detail based on the following figures, wherein.

DETAILED DESCRIPTION OF THE INVENTION

An example of a device to which the magnetic material sensing device, a magnetic material sensing method and an image forming apparatus according to the present invention are applied will be described in detail with reference to the accompanying figures.

Figure 1A:
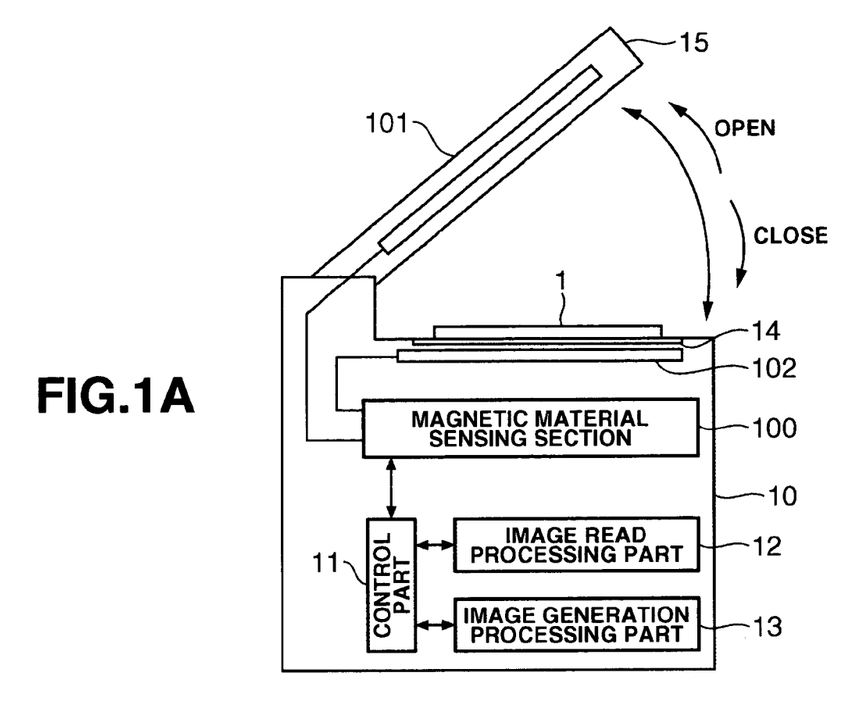
FIGS. 1A and 1B are schematic diagrams of a copy machine 10 to which a magnetic material sensing device and method according to the present invention are applied.
Figure 1B:
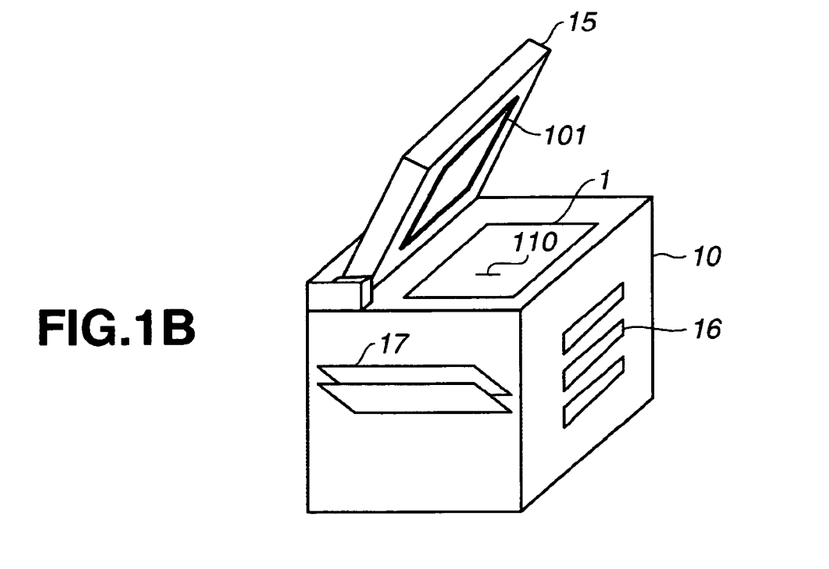

FIGS. 1A and 1B are schematic diagrams of a copy machine 10 to which the magnetic material sensing device and method according to the present invention are applied.

FIG. 1A is a block diagram showing a schematic structure of the copy machine 10, and FIG. 1B is a schematic, perspective diagram of the copy machine 10 shown in FIG. 1A.

As shown in FIGS. 1A and 1B, the copy machine 10 comprises a magnetic material sensing section 100 which senses whether or not a magnetic material 110 indicating non-copiable is applied to an original document 1 placed on a platen glass 14 of the copy machine 10 when copying the original document 1 and outputs a signal about a sensed result; a control part 11 which integrally controls the copy machine 10 as a whole, and if the magnetic material 110 applied to the original document 1 is sensed by the magnetic material sensing section 100, controls to inhibit a copy operation of the copy machine 10; an image read processing part 12 which emits light to the original document 1 placed on the platen glass 14, receives the reflection of the emitted light from the original document 1 by an unshown photoelectric converting element (e.g., CCD=Charge Coupled Device or the like), converts it into an electrical signal and reads image information recorded on the original document 1 according to the electrical signal converted by the photoelectric converting element; and an image generation processing part 13 which prints the image information read by the image read processing part 12 onto an unshown paper fed from a sheet tray 16 and discharges the sheet to an output tray 17.

On the back surface of a platen cover 15 of the copy machine 10 is disposed a sending coil 101 which emits a prescribed alternating magnetic field for magnetizing the magnetic material 110 which is applied to the original document 1; and a receiving coil 102 which is disposed between the platen glass 14 and the magnetic material sensing section 100 so to face the sending coil 101 when the platen cover 15 is closed.

The receiving coil 102 receives a precipitous magnetic pulse which is emitted from the magnetic material 110 when the magnetic material 110 is magnetized and performs magnetization reversal upon receiving the alternating magnetic field from the sending coil 101 and a signal of the alternating magnetic field sent from the sending coil 101.

An operation by the copy machine 10 configured as described above to copy or copy inhibition processing according to the sensed results of the magnetic material 110 of the original document 1 placed on the platen glass 14 will be described briefly.

When the original document 1 is placed on the platen glass 14 of the copy machine 10 and the platen cover 15 is closed (in the arrow direction in the figure), the control part 11 of the copy machine 10 activates the magnetic material sensing section 100 to operate prior to a copying operation that the image information of the original document 1 is read and printed out.

When the magnetic material sensing section 100 is activated, a prescribed alternating magnetic field is emitted from the sending coil 101 of the magnetic material sensing section 100 into a plane on the platen glass 14, and the magnetic material 110 applied to the original document 1 placed on the platen glass 14 is magnetized upon receiving the alternating magnetic field and emits a precipitous magnetic pulse at the time of magnetization reversal.

The magnetic pulse emitted from the magnetic material 110 is received together with the alternating magnetic field sent from the sending coil 101 by the receiving coil 102, and the received signal is undergone prescribed signal processing to detect a pulse signal corresponding to the magnetic pulse emitted from the magnetic material 110. Thus, the magnetic material 110 applied to the original document 1 is sensed.

When the magnetic material 110 is sensed by the magnetic material sensing section 100 according to the sensed result of the magnetic material 110 of the original document 1, the control part 11 of the copy machine 10 controls to inhibit a copy processing operation. Where the magnetic material 110 is not sensed, the copy processing operation is performed by reading the image information of the original document 1 placed on the platen glass 14, printing the read image information onto a copy paper fed from the sheet tray 16, and discharging the copy paper to the output tray 17.

Thus, the copy machine 10 judges whether the original document 1 is copiable or non-copiable depending on whether or not the magnetic material 110 is applied to the original document 1 before the copy processing operation of the original document 1 placed on the platen glass 14 is performed. If it is identified as non-copiable, the copy machine 10 controls to inhibit the copy processing operation, thereby enabling to prevent the non-copiable original document such as confidential information from being copied unexpectedly or without authorization and suppressing an unnecessary copy processing to save electric power of the copy machine 10.

The identification by the magnetic material sensing section 100 whether the original document 1 placed on the platen glass 14 is copiable or non-copiable is not particularly limited when it is conducted. It may be performed after the original document 1 is placed on the platen glass 14 and the platen cover 15 is closed, after a copy start instruction is given to the copy machine 10 or before the copy start instruction is given.

To copy the original document placed in an arbitrary direction at an arbitrary position on the platen glass 14, the copy machine 10 shown in FIG. 1 has a function to sense a magnetic material having a prescribed magnetic characteristic indicating copy inhibition applied to the original document such as confidential information and, when the magnetic material is sensed, to perform a control operation to inhibit an original document copy operation.

Figure 2A:
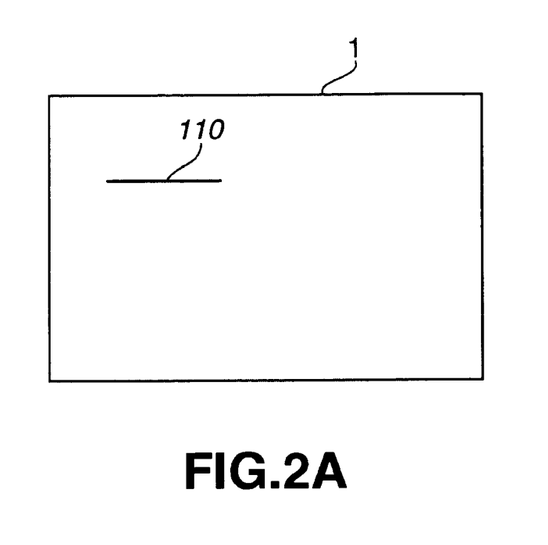
FIGS. 2A, 2B and 2C are diagrams showing magnetic characteristics of a magnetic material 110 applied to an original document.
Figure 2B:
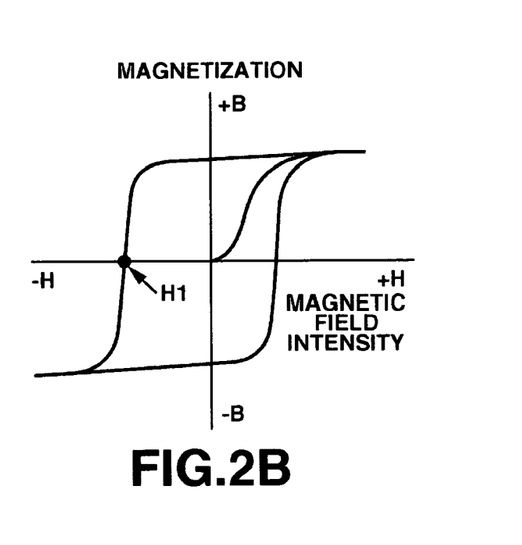
Figure 2C:
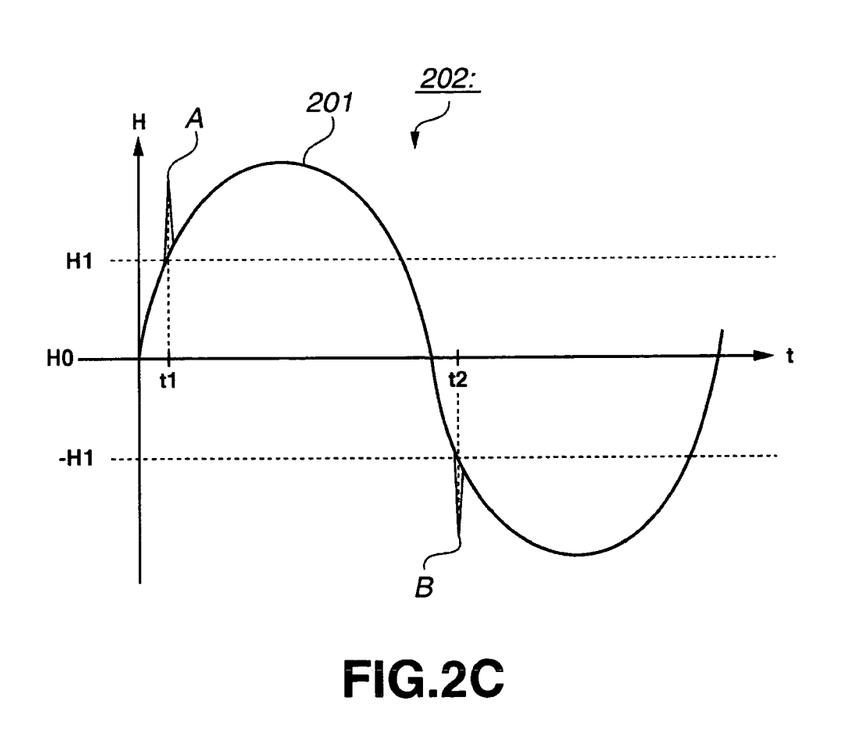

FIGS. 2A, 2B and 2C are diagrams showing characteristics of the magnetic material 110 having prescribed magnetic characteristics to be applied to the original document such as confidential information. FIG. 2A is a diagram showing an example of the original document 1 to which the magnetic material 110 indicating non-copiable is applied, FIG. 2B is a diagram showing a magnetic characteristic of the magnetic material 110, and FIG. 2C is a diagram showing a pulse signal to be sensed in correspondence with a precipitous magnetic pulse emitted at the time of magnetization reversal when the magnetic material 110 receives a prescribed alternating magnetic field.

As shown in FIG. 2A, the magnetic material 110 indicating non-copiable is applied to the original document 1, a prescribed alternating magnetic field is given to the original document 1 to magnetize the magnetic material 110, and the magnetized magnetic material 110 emits a precipitous magnetic pulse at the time of magnetization reversal.

The magnetic material 110 is an amorphous magnetic wire having a magnetic characteristic which is indicated by a rectangular magnetization curve (B-H curve) as shown in FIG. 2B. When the magnetic material 110 having such a magnetization curve receives an alternating magnetic field, it exhibits a characteristic, the so-called large Barkhausen effect, that a precipitous magnetic pulse is emitted at the time of the magnetization reversal by receiving an alternating magnetic field having a magnetic field strength exceeding an intrinsic coercive force H1 (see FIG. 2B) possessed by the magnetic material 110.

Generally, the intrinsic coercive force possessed by the magnetic material of the amorphous magnetic wire is variable depending on the size, shape and the like of the magnetic material, and the strength of the magnetic pulse emitted at the time of magnetization reversal and its timing are also variable depending on the intrinsic coercive force possessed by the magnetic material.

Using the characteristic of the magnetic material of the amorphous magnetic wire, it is also possible to sense as the inherent identification information of the original document 1 by applying, for example, plural types in shape, size and the like of plural magnetic materials having a different coercive force in combination to the original document 1.

Thus, the magnetic material 110 indicating non-copiable is applied to the original document 1, and when the original document 1 is placed on the platen glass 14 of the copy machine 10 and the platen cover 15 is closed, the magnetic material 110 applied to the original document 1 receives the alternating magnetic field emitted from the sending coil 101, performs magnetization reversal and emits a magnetic pulse by the large Barkhausen effect at that time.

For example, as indicated by a detected signal waveform 202 of FIG. 2C, the magnetic material 110 having the coercive force H1 performs magnetization reversal when an alternating magnetic field 201 is sent from the sending coil 101 and a magnetic field strength becomes approximately H1 at time t1 from the reference signal output with prescribed timing and emits a precipitous magnetic pulse signal A at that time.

When the magnetic field strength of the alternating magnetic field 201 becomes −H1 at time t2, the magnetic material 110 performs magnetization reversal from positive magnetization to negative magnetization and emits a precipitous magnetic pulse signal B at that time.

The magnetic material having the magnetic characteristic described above is applied to the original document such as confidential information or the like, and it is controlled to sense the magnetic material applied to the original document and to inhibit the copy processing operation, thereby enabling to prevent confidential information from being copied unexpectedly and from being outflown.

But, the method of sensing a magnetic pulse, which is emitted when a prescribed alternating magnetic field is given to the magnetic material and the magnetic material which has received the alternating magnetic field performs magnetization reversal, detects by receiving the signal corresponding to the magnetic pulse, which is emitted from the magnetic material, by the receiving coil, so that it is easily influenced by a signal due to a magnetic field generated from a metal or a metallic structure other than the prescribed magnetic material applied to the original document.

For example, if a metal and a metallic structure are present near the sending coil and the receiving coil, multiple reflection of the alternating magnetic field and the magnetic pulse occurs between the individual coils and the metal and metal structure, and it might become difficult to sense the signal emitted from the prescribed magnetic material.

Therefore, it is significant to sense the signal emitted from the prescribed magnetic material by eliminating the influence of an external environment of the metal and the metallic structure present near the sending coil and the receiving coil.

Thus, when the copy machine 10 surely controls to inhibit the copy processing operation of the original document such as confidential information or the like, the magnetic material sensing section 100 needs to surely sense the magnetic material applied to the original document, and the magnetic material sensing section 100 is required to sense the magnetic material with high accuracy by eliminating an influence of the external environment.

The copy machine 10 shown in FIGS. 1A and 1B is provided with the magnetic material sensing section 100 for sensing the magnetic material applied to the original document which is placed in an arbitrary direction at an arbitrary position on the platen glass 14 without contacting. This magnetic material sensing section 100 is configured such that it can surely sense a signal which is emitted from the magnetic material applied to the original document by removing an influence of the external environment even if a metal or a metallic structure which reflects an electromagnetic wave is present near the sending coil for sending the alternating magnetic field and the receiving coil for receiving a signal of the magnetic pulse emitted when the magnetic material receives the alternating magnetic field sent from the sending coil and performs magnetization reversal.

Figure 3:
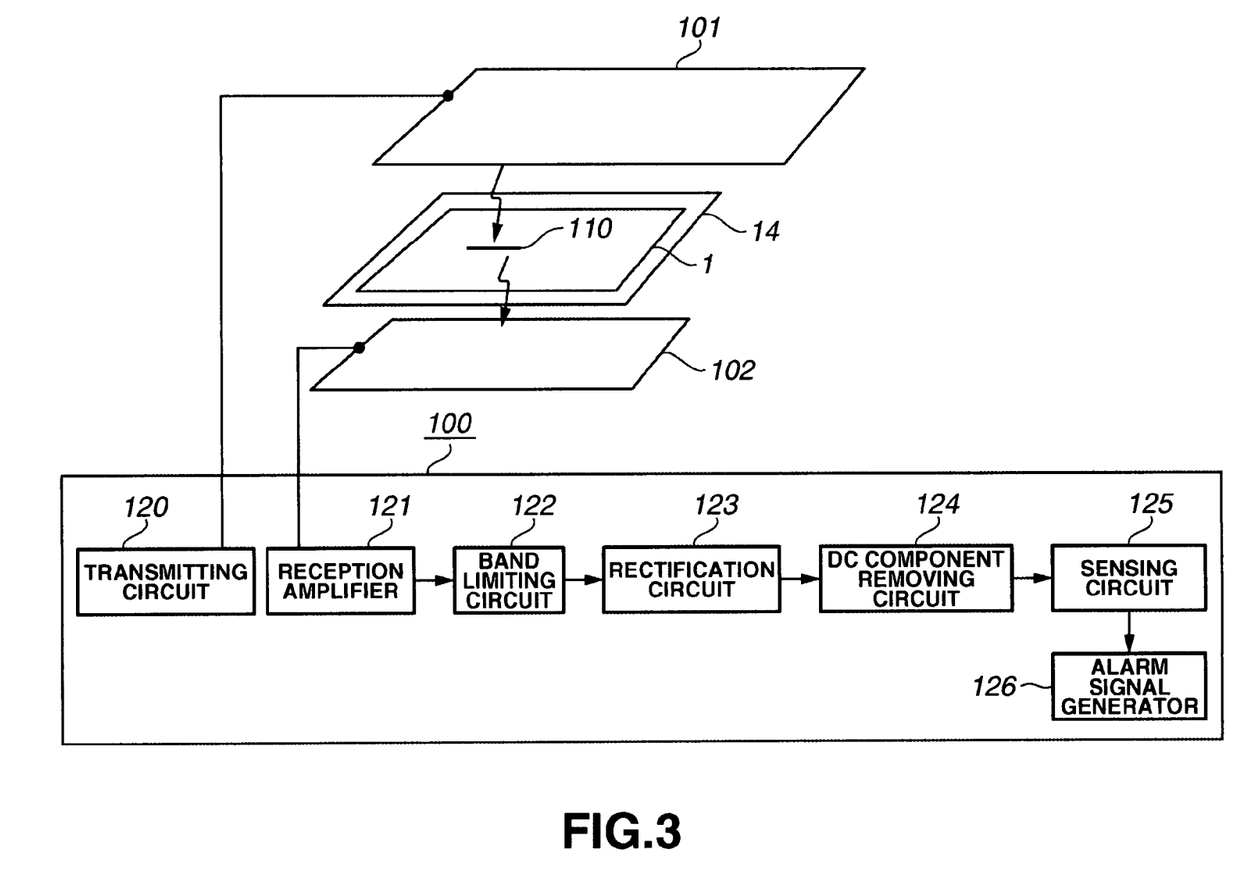
FIG. 3 is a block diagram showing a structure of a main part of a magnetic material sensing section 100.

FIG. 3 is a block diagram showing a structure of a main part of the magnetic material sensing section 100.

As shown in FIG. 3, the magnetic material sensing section 100 is provided with a transmitting circuit 120 which controls to generate an AC sine wave and to send a prescribed alternating magnetic field via the sending coil 101; the sending coil 101 which sends a prescribed alternating magnetic field according to the AC sine wave generated by the transmitting circuit 120; the receiving coil 102 which receives an alternating magnetic field sent from the sending coil 101 and a precipitous magnetic pulse which is emitted from the magnetic material 110 applied to the original document 1 when it is magnetized and performs magnetization reversal upon receiving the alternating magnetic field; a reception amplifier 121 which amplifies the receiving signal received by the receiving coil 102; a band limiting circuit 122 which eliminates the same-phase noise component by filtering the receiving signal amplified by the reception amplifier 121; a rectification circuit 123 which extracts the pulse signal corresponding to the magnetic pulse, which is emitted from the magnetic material 110 applied to the original document 1 at the time of the magnetization reversal, from the signal filtered by the band limiting circuit 122 and amplifies it; a DC component removing circuit 124 which removes a signal influenced by the external environment such as a metal or a metallic structure which reflects an electromagnetic wave from the pulse signal extracted and amplified by the rectification circuit 123; a sensing circuit 125 which senses the presence or not of the magnetic material 110 according to the DC component-removed output signal having the signal influenced by the external environment removed by the DC component removing circuit 124; and an alarm signal generator 126 which issues an alarm according to the result of sensing the presence or not of the magnetic material 110 sensed by the sensing circuit 125.

Timing of detection of the receiving signal of the alternating magnetic field sent from the sending coil 101 and the magnetic pulse or alternating magnetic field, which is emitted from the magnetic material and received via the receiving coil, is determined such that, for example, the transmitting circuit 120 controls to flow electric current with a frequency of 1 kHz to the sending coil 101, an alternating magnetic field with a frequency of 1 kHz is sent from the sending coil 101, the alternating magnetic field sent from the sending coil 101 is received by the magnetic material 110 applied to the original document 1, the precipitous magnetic pulse and alternating magnetic field emitted at the time of magnetization reversal of the magnetic material 110 are received by the receiving coil 102, a period in which a current value becomes zero in a rising direction of the current having a frequency of 1 kHz generated by the transmitting circuit 120, namely a period in which the direction of the electric current is reversed from negative to positive, is detected, and detection is made according to a reference signal which is output one time per cycle of the alternating magnetic field within the detected period.

Upon sensing the magnetic material 110, the sensing circuit 125 transfers a sensed signal indicating that the magnetic material 110 is sensed to the control part 11 and the alarm signal generator 126 of the copy machine 10, and according to the sensed signal output from the sensing circuit 125 and indicating that the magnetic material 110 is sensed, the alarm signal generator 126 outputs a message indicating non-copiable such as "This original document is non-copiable." or the like or an audio warning or the like, and the control part 11 of the copy machine 10 controls to inhibit the copy processing operation.

The sensing method of surely sensing the magnetic material 110 applied to the original document 1 even if the magnetic material sensing section 100 configured as described above has a metal or a metallic structure, which reflects an electromagnetic wave, near the sending coil and the receiving coil of the magnetic material sensing section 100, and the control operation of the magnetic material sensing section 100 will be described in detail with reference to FIG. 4 through FIG. 9B.

Figure 4:
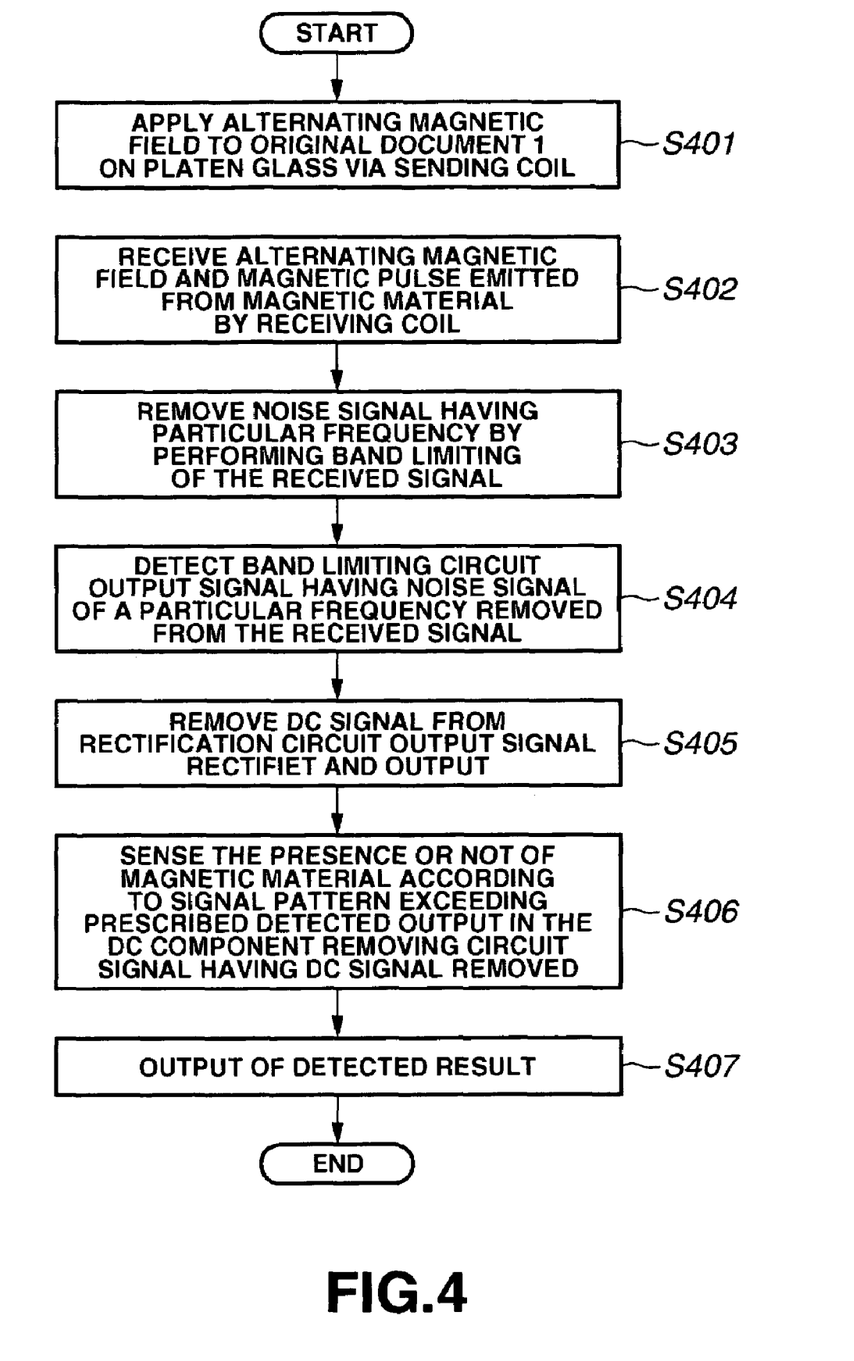
FIG. 4 is a flow chart showing a method of sensing the magnetic material 110 applied to an original document 1 by the magnetic material sensing section 100.

FIG. 4 is a flow chart showing a method of surely sensing by the magnetic material sensing section 100 the magnetic material 110 applied to the original document 1 even if there is a metal or a metallic structure which reflects an electromagnetic wave near the sending coil and the receiving coil.

As shown in FIG. 4, when the original document 1 is placed on the platen glass 14 of the copy machine 10 and the magnetic material sensing section 100 is activated, a prescribed alternating magnetic field is sent from the sending coil 101 of the magnetic material sensing section 100 (step S401).

Figure 5A:
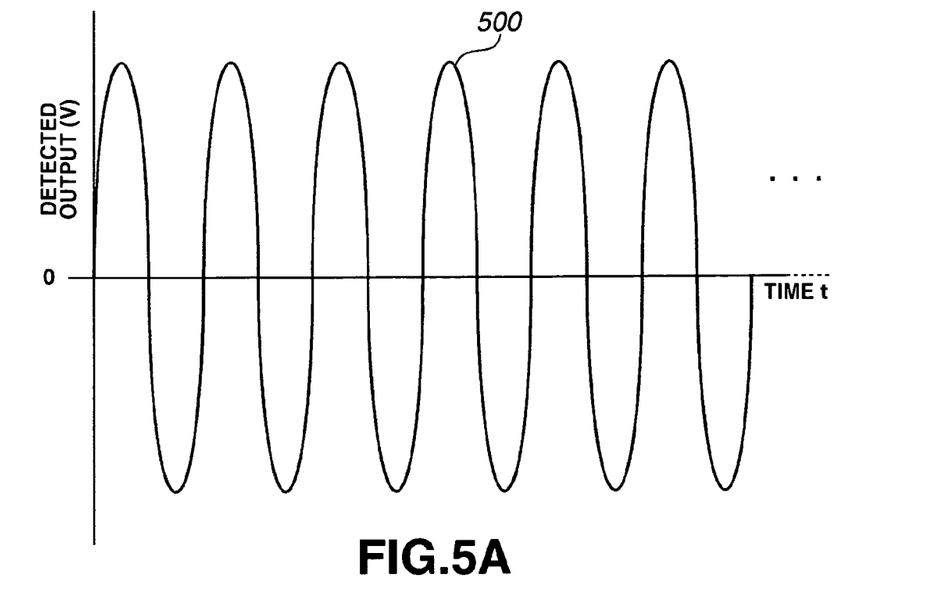
FIGS. 5A and 5B are diagrams showing a waveform signal 500 of an alternating magnetic field transmitted and a pulse signal corresponding to a magnetic pulse emitted from a magnetic material.

Specifically, the transmitting circuit 120 of the magnetic material sensing section 100 applies an operating voltage to an unshown voltage controlled oscillator (VCO) to generate an AC sine wave, and the generated AC sine wave is sent as an alternating magnetic field of a transmission waveform 500 shown in FIG. 5A (hereinafter referred to as the "alternating magnetic field 500") from the sending coil 101 into the plane on the platen glass 14 via an unshown transmitter and the sending coil 101.

The magnetic material 110 applied to the original document 1 placed on the platen glass 14 is magnetized upon receiving the alternating magnetic field 500 and emits a precipitous magnetic pulse at the time of magnetization reversal.

Figure 5B:
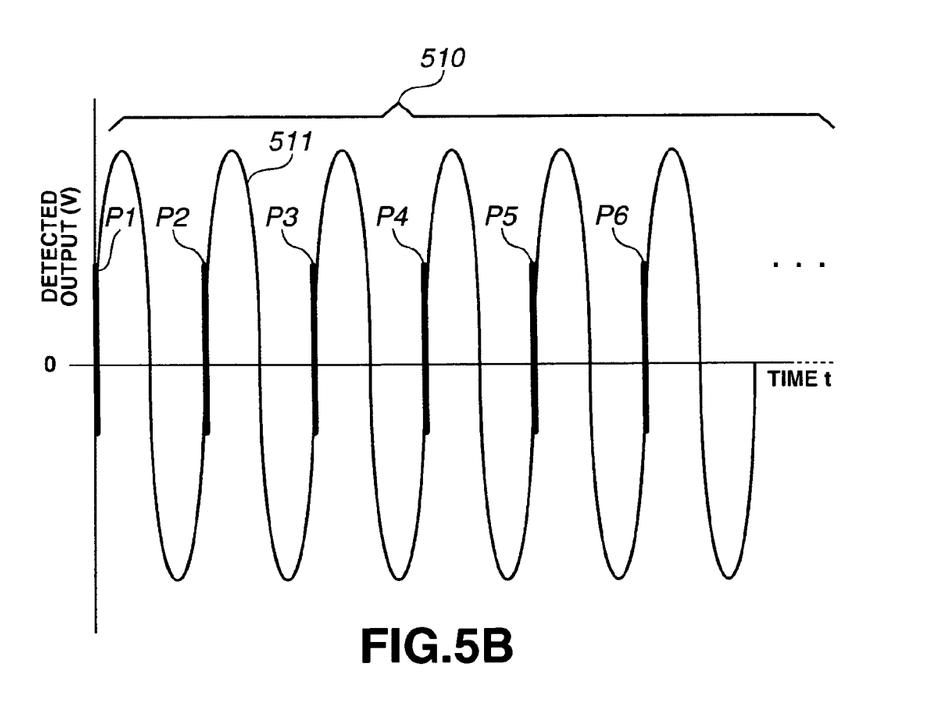

The alternating magnetic field 500 and the magnetic pulse emitted from the magnetic material 110 is received by the receiving coil 102 and amplified to a prescribed level by the reception amplifier 121. And, a receiving signal 510 with the waveform as shown in FIG. 5B is detected (step S402).

The receiving signal 510 includes a waveform signal 511 corresponding to the alternating magnetic field 500 and pulse signals P1, P2, P3, P4, P5, P6, . . . corresponding to the magnetic pulse emitted from the magnetic material 110.

The receiving signal 510 amplified by the reception amplifier 121 is filtered by the band limiting circuit 122 to remove the waveform signal 511 corresponding to the alternating magnetic field 500 and other noise signals, and the pulse signals P1, P2, P3, P4, P5, . . . are amplified and output (step S403).

Figure 6A:
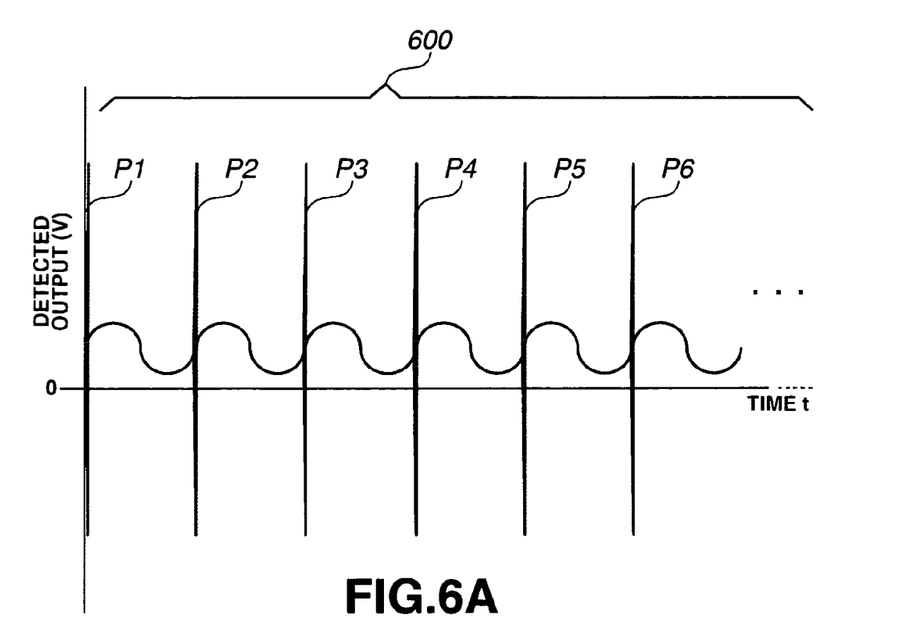
FIGS. 6A and 6B are diagrams showing band limiting circuit output signals 600 and 610 output from a band limiting circuit 122.
Figure 6B:
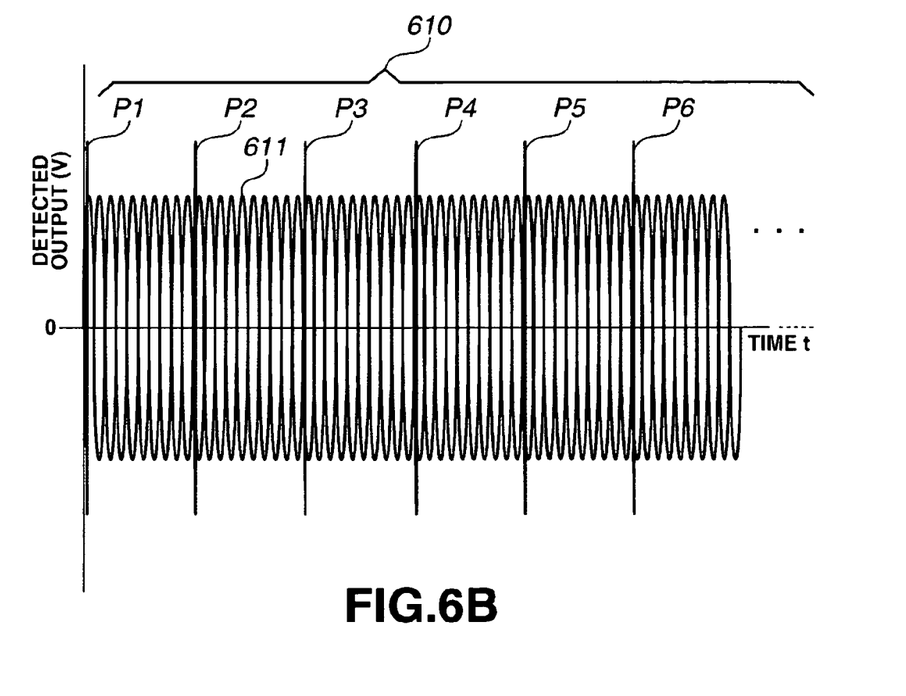

The band limiting circuit 122 is provided with an unshown low pass filter and high pass filter, and signals of a high-frequency noise component and a low-frequency noise component in the vicinity of the transmission frequency in correspondence with the transmission frequency of the alternating magnetic field 500 sent from the sending coil 101 are removed by the low pass filter and the high pass filter and amplified to detect band limiting circuit output signals of waveform signals 600, 610 shown in FIG. 6A or FIG. 6B.

FIG. 6A is a diagram showing a waveform of the band limiting circuit output signal 600 which is output from the band limiting circuit 122 when a metal or a metallic structure is not present near the sending coil and the receiving coil of the magnetic material sensing section 100, and FIG. 6B is a diagram showing a waveform of the band limiting circuit output signal 610 which is output from the band limiting circuit 122 when a metal or a metallic structure is present near the sending coil and the receiving coil of the magnetic material sensing section 100.

The output signal from the band limiting circuit 122 shows a difference in output signal as indicated by the band limiting circuit output signals 600 (FIG. 6A) and 610 (FIG. 6B) depending on the presence or not of the metal or the metallic structure nearby.

Specifically, as indicated by the band limiting circuit output signal 600 of FIG. 6A, if the metal or the metallic structure is not present near the individual coils 101, 102, the waveform signal 510 corresponding to the alternating magnetic field 500 and other noise signals are removed by the band limiting circuit 122, so that the pulse signals P1, P2, P3, P4, P5, P6, . . . can be detected. But, if the metal or the metallic structure is present near the transmitting circuit 120 and the sending coil 101 as indicated by the band limiting circuit output signal 610 of FIG. 6B, the alternating magnetic field sent from the sending coil 101 is influenced by the metallic structure and the like by causing multiple reflection between the sending coil 101 and the metallic structure. Therefore, by simple elimination of the waveform signal 510 corresponding to the alternating magnetic field 500 and the noise signals of only a particular frequency, a signal 611 of the noise component due to the multiple reflection between the sending coil 101 and the metallic structure other than the pulse signals P1, P2, P3, P4, P5, . . . cannot be removed but detected. Thus, it becomes difficult to detect the pulse signals P1, P2, P3, P4, P5, P6, . . .

The frequency of the noise signal depends on the characteristics of the band limiting circuit 122 and is variable depending on the presence or not of the metallic structure near the sending coil 101. Therefore, it is hard to remove the noise signals other than the pulse signals P1, P2, P3, P4, P5, P6, . . . by simply removing the noise signal of a particular frequency by the band limiting circuit 122.

Figure 7A:
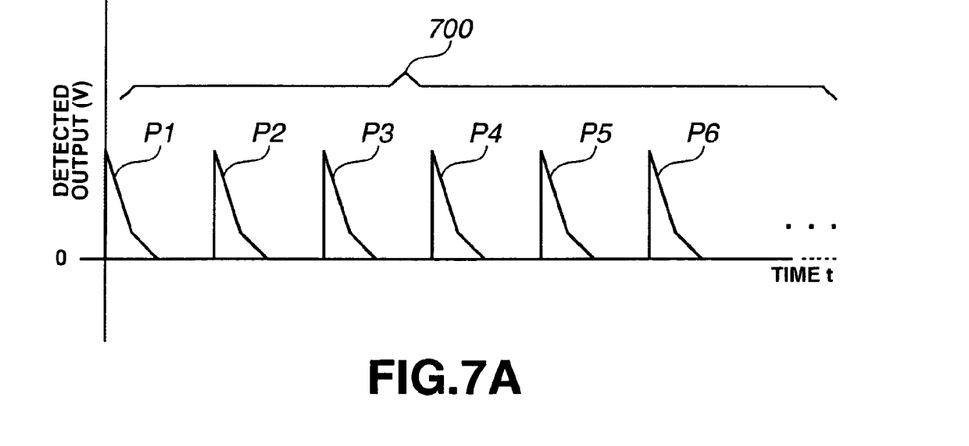
FIGS. 7A and 7B are diagrams showing rectification circuit output signals 700 and 710 output from a rectification circuit 123.
Figure 7B:
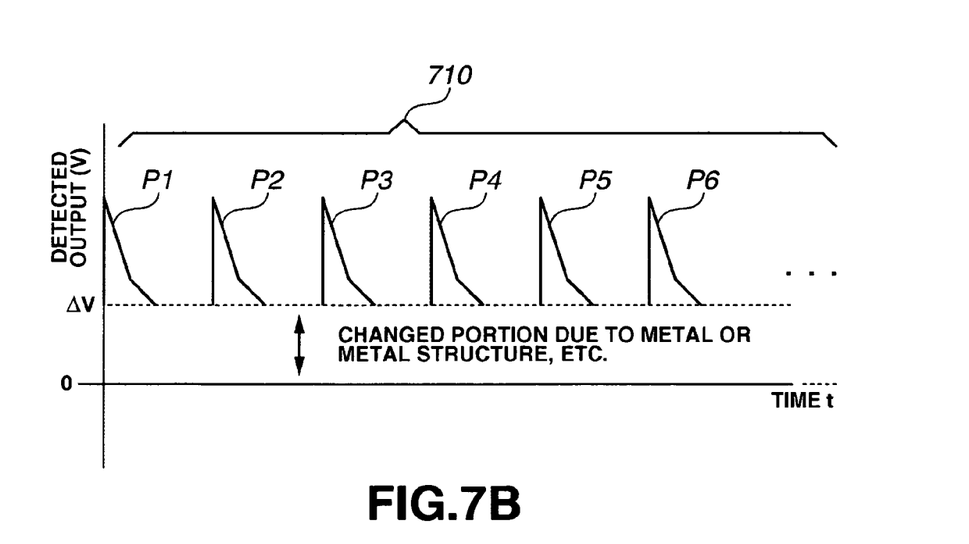

Accordingly, when the band limiting circuit output signal 600 or 610 which is filtered by the band limiting circuit 122 to remove the same-phase noise component is rectified by the rectification circuit 123 and amplified, rectification circuit output signals of waveform signals 700, 710 are detected as shown in FIG. 7A or FIG. 7B (step S404).

FIG. 7A is a diagram showing a waveform of the rectification circuit output signal 700 which is output by detecting the band limiting circuit output signal 600 by the rectification circuit 123 when the metal and the metallic structure are not present near the sending coil and the receiving coil of the magnetic material sensing section 100. FIG. 7B is a diagram showing a waveform of the rectification circuit output signal 710 which is output by rectifying the band limiting circuit output signal 610 by the rectification circuit 123 when the metal and the metallic structure are present near the sending coil and the receiving coil of the magnetic material sensing section 100.

The output signal from the rectification circuit 123 has a difference in output signal as indicated by the rectification circuit output signals 700 (FIG. 7A) and 710 (FIG. 7B) depending on the presence or not of the metal and the metallic structure.

Specifically, when the metal and the metallic structure are not present near the individual coils 101, 102, noise signals other than the pulse signals P1, P2, P3, P4, P5, P6, . . . are removed and, only the pulse signals P1, P2, P3, P4, P5, P6, . . . are detected as indicated by rectification circuit output signal 700 of FIG. 7A. But, when the metal and the metallic structure are present near the transmitting circuit 120 and the sending coil 101, a signal corresponding to the noise component due to the influence of the metal and the metallic structure is detected as a DC signal, and the rectification circuit output signal 710 having an output waveform having the DC signal synthesized with the pulse signals P1, P2, P3, P4, P5, P6, . . . is detected as indicated by the rectification circuit output signal 710 of FIG. 7B.

The rectification circuit output signal 700 (FIG. 7A) or 710 (FIG. 7B) detected by the rectification circuit 123 is input to the DC component removing circuit 124. And, the rectification circuit output signal 700 is output as a waveform signal corresponding to the rectification circuit output signal 700, and the rectification circuit output signal 710 is output as a waveform signal which has a DC signal of a noise component due to the influence of the metal or the metallic structure removed (step S405).

Figure 8A:
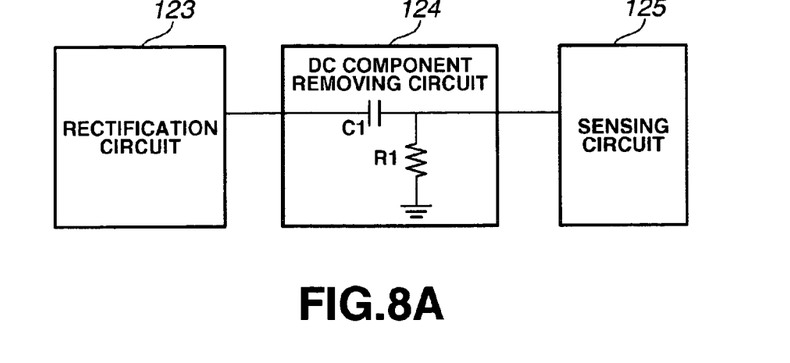
FIGS. 8A, 8B and 8C are a diagram showing a circuit structure of a DC component removing circuit 124 and diagrams showing input/output waveform signals of the DC component removing circuit 124.
Figure 8B:
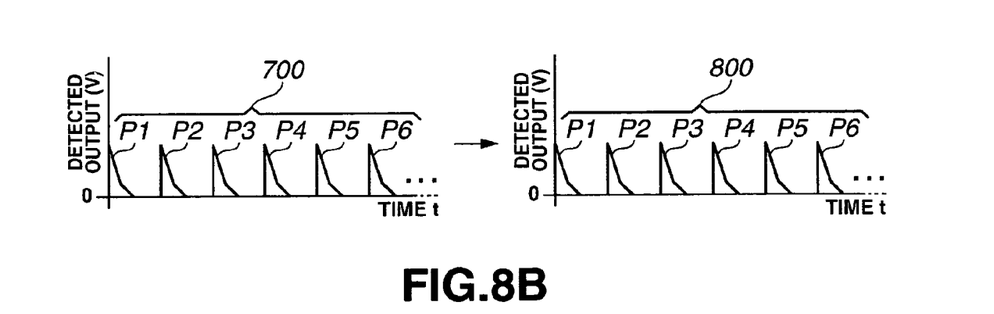
Figure 8C:
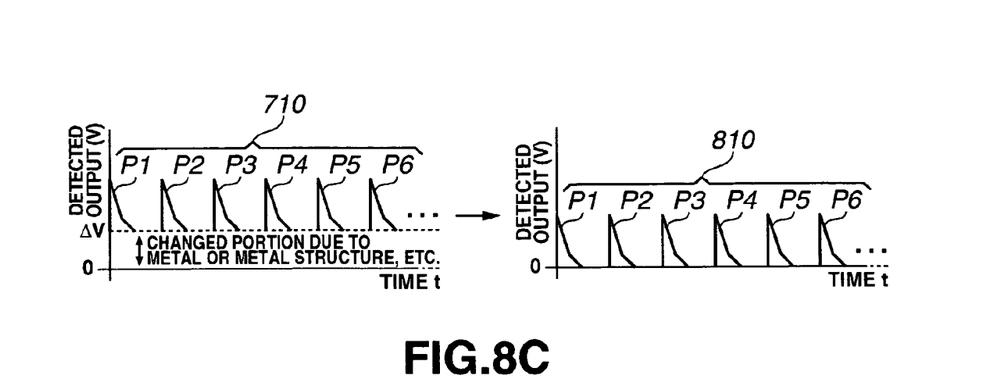

FIGS. 8A, 8B and 8C are diagrams showing a circuit structure of the DC component removing circuit 124 and input/output waveform signals of the DC component removing circuit 124. FIG. 8A is a diagram showing the circuit structure of a main part of the DC component removing circuit 124 which is connected between the rectification circuit 123 and the sensing circuit 125, FIG. 8B shows waveform signals of the rectification circuit output signal 700 and a DC component removing circuit output signal 800 which is output as a result of signal processing of the rectification circuit output signal 700 by the DC component removing circuit 124, and FIG. 8C shows waveform signals of the rectification circuit output signal 710 and a DC component removing circuit output signal 810 which is output as a result of signal processing of the rectification circuit output signal 700 by the DC component removing circuit 124.

As shown in FIG. 8A, the DC component removing circuit 124 is configured of a capacitor C1 having a prescribed electrostatic capacity and a resistor R1 having a prescribed resistance value. As shown in FIG. 8B, when the rectification circuit output signal 700 output from the rectification circuit 123 is input to the DC component removing circuit 124, it is output as the DC current removal circuit output signal 800 from the DC component removing circuit 124 as a waveform signal corresponding to the rectification circuit output signal 700 because the rectification circuit output signal 700 does not include a DC signal. As shown in FIG. 8C, when the rectification circuit output signal 710 output from the rectification circuit 123 is input to the DC component removing circuit 124, a DC signal of a noise component due to the influence of the metal and the metallic structure contained in the rectification circuit output signal 710 is removed by the capacitor C1 of the DC component removing circuit 124 and output as a waveform signal of the DC current removal circuit output signal 810.

The DC current removal circuit output signal 800 (FIG. 8B) or 810 (FIG. 8C) output from the DC component removing circuit 124 is input to the sensing circuit 125. The sensing circuit 125 detects a pulse signal corresponding to the magnetic pulse emitted from the magnetic material 110 applied to the original document 1 and senses presence of the magnetic material 110 (step S406).

Figure 9A:
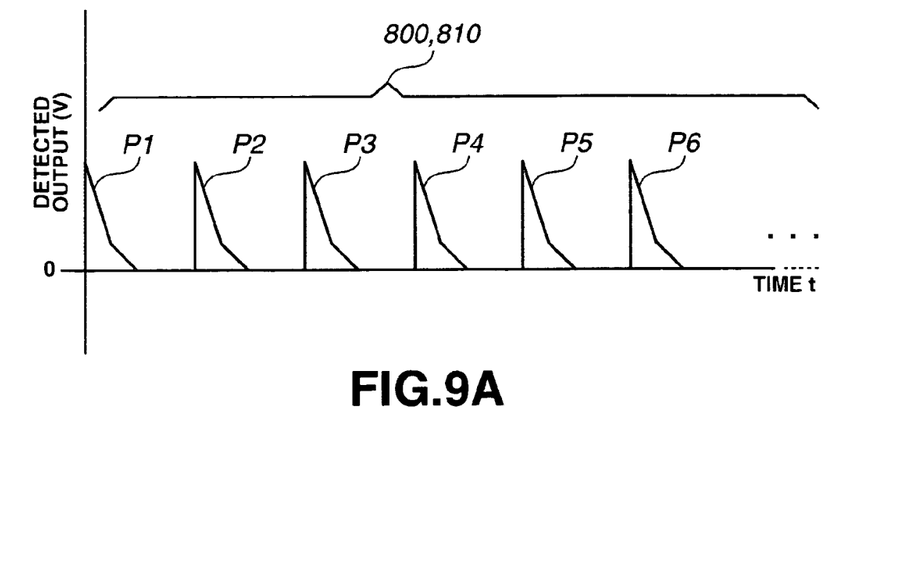
FIGS. 9A and 9B are diagrams showing a signal processing operation to detect a pulse signal corresponding to the magnetic pulse emitted from the magnetic material 110 from the DC current removal circuit output signal 700 by a sensing circuit 125.
Figure 9B:
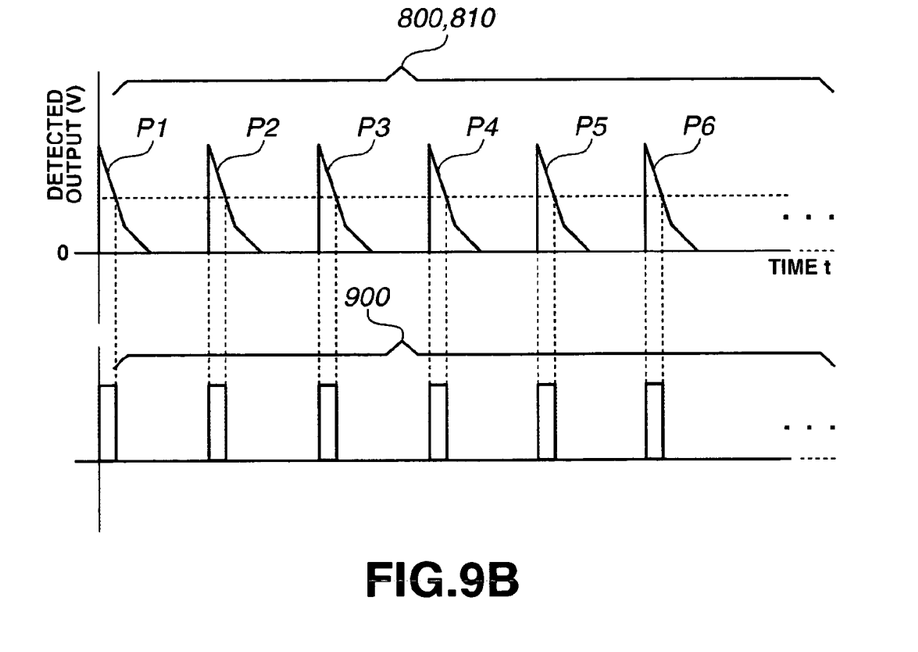

FIGS. 9A and 9B are diagrams showing a signal processing operation to detect a pulse signal corresponding to the magnetic pulse emitted from the magnetic material 110 from the DC current removal circuit output signal 800 or 810 input by the sensing circuit 125.

FIG. 9A is a diagram showing a waveform signal of the DC current removal circuit output signal 800 or 810, and FIG. 9B is a diagram showing a pulse signal corresponding to the magnetic pulse emitted from the magnetic material 110 according to the DC current removal circuit output signal 800 or 810.

As shown in FIG. 9A, the DC current removal circuit output signal 800 or 810 is shown as a waveform signal that the rising detected output of the pulse signals P1, P2, P3, P4, P5, P6, . . . , which correspond to the magnetic pulses which are emitted from the magnetic material 110 when it performs magnetization reversal in accordance with the frequency of the alternating magnetic field sent from the sending coil 101, are detected as precipitous rising output, and the detected output of the pulse signals are attenuated gently with time.

Accordingly, as shown in FIG. 9B, the signal control is performed such that a prescribed threshold value is determined for the detection output of the DC current removal circuit output signal 800 or 810, and a period when the detection output of the individual pulse signals exceeds the threshold value is "ON" and a period when it does not exceed the threshold value is "OFF". Then, "ON", "OFF" signals 900 corresponding to the pulse signals P1, P2, P3, P4, P5, P6, . . . emitted from the magnetic material 110 are generated, and if the "ON" signal is detected, the magnetic material 110 is judged as sensed.

When the magnetic material 110 applied to the original document 1 is sensed by the sensing circuit 125, a sensed signal indicating that the magnetic material 110 is sensed is transferred to the control part 11 and the alarm signal generator 126 of the copy machine 10, the alarm signal generator 126 outputs a message indicating copy inhibition such as "This original document is non-copiable." or an audio warning or the like (step S407), and the control part 11 of the copy machine 10 controls to inhibit the copy processing operation.

Thus, the magnetic material sensing section 100 according to the present invention filters by the band limiting circuit 122 the signal of the magnetic pulse emitted from the magnetic material 110 and the alternating magnetic field 500 received and amplified by the receiving coil 102 and the reception amplifier 121, rectifies by the rectification circuit 123 and removes the signal of a noise component due to the influence by the external environment such as the metal and the metallic structure as a DC signal by the DC component removing circuit 124, so that even if the metal and the metallic structure which reflect an electromagnetic wave are present near the sending coil and the receiving coil, the signal emitted from the magnetic material applied to the original document can be sensed without fail.

Figure 10A:
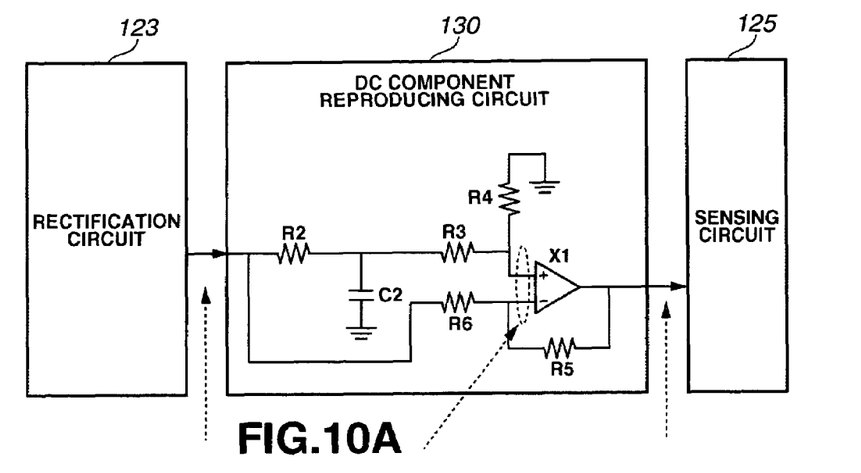
FIGS. 10A, 10B and 10C are diagrams showing a circuit structure of a DC reproducing circuit 130 and its input/output waveform signals.
Figure 10B:
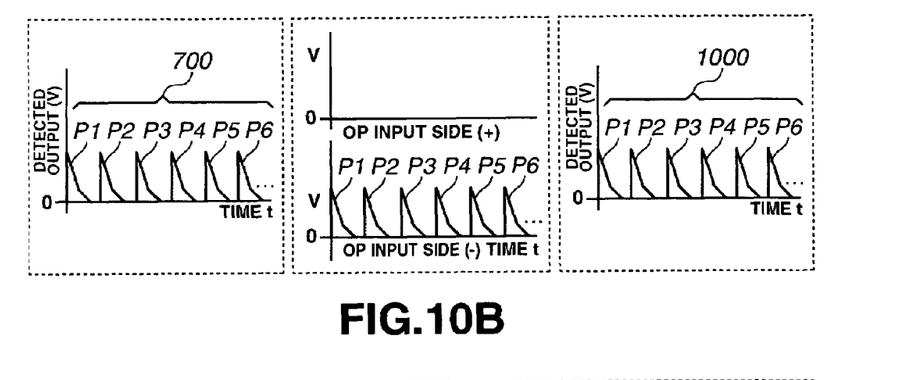
Figure 10C:
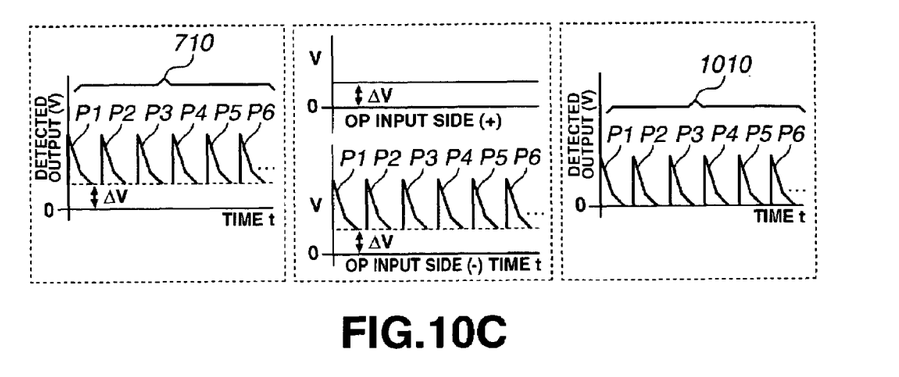

Even if the DC component removing circuit 124 of the magnetic material sensing section 100 is replaced with the DC reproducing circuit 130 having the circuit structure shown in FIG. 10, the same effects as those described above can be obtained.

FIGS. 10A, 10B and 10C are diagrams showing a circuit structure of the DC reproducing circuit 130 and input/output waveform signals of the DC reproducing circuit 124. FIG. 10A is a diagram showing a circuit structure of a main part of the DC reproducing circuit 130 which is connected between the rectification circuit 123 and the sensing circuit 125, FIG. 10B is a diagram showing the individual waveform signals of a DC reproducing circuit output signal 1000 and the rectification circuit output signal 700 output after the signal processing of the rectification circuit output signal 700 by the DC reproducing circuit 130, and FIG. 10C is a diagram showing the individual waveform signals of a DC reproducing circuit output signal 1010 and the rectification circuit output signal 710 output after the signal processing of the rectification circuit output signal 710 by the DC reproducing circuit 130.

As shown in FIG. 10A, the DC reproducing circuit 130 is configured such that a circuit comprised of resistors R2, R3, R4 and a capacitor C2 is connected to the input side (+) of an operational amplifier (=OP) X1 to input only the signal of a DC component of the rectification circuit output signal 700 or 710 output from the rectification circuit 123, a circuit comprised of resistors R6 and R5 is connected to the input side (−) of the operational amplifier X1 to input the rectification circuit output signal 700 or 710 output from the rectification circuit 123, and the DC component signal is differentiated from the rectification circuit output signal 700 or 710.

As shown in FIG. 10B, when the rectification circuit output signal 700 is output from the rectification circuit 123, the input value of the input side (+) of the operational amplifier X1 of the DC reproducing circuit 130 is approximately zero and the rectification circuit output signal 700 is input to the input side (−) of the operational amplifier X1 because the rectification circuit output signal 700 does not include a DC signal corresponding to a noise signal due to the influence of the metal or the metallic structure, so that a waveform signal corresponding to the rectification circuit output signal 700 is output from the operational amplifier X1, and the DC reproducing circuit output signal 1000 of the same waveform signal as that of the DC current removal circuit output signal 800 shown in FIG. 8B is output from the DC reproducing circuit 130.

As shown in FIG. 10C, when the rectification circuit output signal 710 is output from the rectification circuit 123, because the rectification circuit output signal 710 contains a DC signal (signal corresponding to the ΔV in the figure) corresponding to the noise signal due to the influence of the metal and the metallic structure, a DC signal of the output of ΔV corresponding to the noise signal due to the influence of the metal and the metallic structure is input to the input side (+) of the operational amplifier X1 of the DC reproducing circuit 130, the rectification circuit output signal 710 is input to the input side (−) of the operational amplifier X1, a DC signal portion of ΔV corresponding to the noise signal due to the influence of the metal and the metallic structure is removed from the rectification circuit output signal 710, and the DC reproducing circuit output signal 1010 of the same waveform signal as the DC current removal circuit output signal 810 shown in FIG. 8C is output from the operational amplifier X1.

As described above, a first aspect of the present invention provides a magnetic material sensing device which senses a magnetic material by detecting a signal which the magnetic material emits when an alternating magnetic field is applied, the magnetic material sensing device includes: an exciting coil which applies the alternating magnetic field; a receiving coil which receives a first signal which is generated due to the alternating magnetic field; a noise signal removing part that removes, from the first signal, a noise signal of an object which reflects the alternating magnetic field; and a detecting part that detects, from the noise signal-removed signal, the signal emitted from the magnetic material.

A second aspect of the present invention is the magnetic material sensing device according to the first aspect of the invention, in which the noise signal removing part may include a rectification part that rectifies the first signal and a DC signal removing part that removes a DC signal from the rectified first signal.

A third aspect of the present invention is the magnetic material sensing device according to the first aspect of the invention, in which the noise signal removing part may include a rectification part that rectifies the first signal, a DC signal extracting part that extracts a DC signal from the rectified first signal and a DC signal removing part that differentially amplifies the extracted DC signal and the rectified first signal to cancel the DC signal contained in the rectified first signal.

A fourth aspect of the present invention is the magnetic material sensing device according to the second aspect of the invention, in which the detecting part may detect the signal emitted from the magnetic material by detecting that the noise signal-removed signal exceeds a value.

A fifth aspect of the present invention is the magnetic material sensing device according to the third aspect of the invention, in which the detecting part may detect the signal emitted from the magnetic material by detecting that the noise signal-removed signal exceeds a value.

A sixth aspect of the present invention provides a magnetic material sensing method for sensing a magnetic material by detecting a signal which the magnetic material emits when an alternating magnetic field is applied, the magnetic material sensing method includes: applying the alternating magnetic field; receiving a first signal which is generated due to the alternating magnetic field; removing, from the first signal, a noise signal of an object which reflects the alternating magnetic field; and detecting, from the noise signal-removed signal, the signal emitted from the magnetic material.

A seventh aspect of the present invention is the magnetic material sensing method according to the sixth aspect of the invention, in which removing the noise signal from the first signal includes rectifying the first signal and removing a DC signal from the rectified first signal.

An eighth aspect of the present invention is the magnetic material sensing method according to the sixth aspect of the invention, in which removing the noise signal from the first signal may include: rectifying the first signal; extracting a DC signal from the rectified first signal; and differentially amplifying the extracted DC signal and the rectified first signal to cancel the DC signal contained in the rectified first signal.

A ninth aspect of the present invention is the magnetic material sensing method according to the seventh aspect of the invention, in which detecting the magnetic material may be performed by detecting that the noise signal-removed signal exceeds a value.

A tenth aspect of the present invention is the magnetic material sensing method detecting the magnetic material may be performed by detecting that the noise signal-removed signal exceeds a value.

An eleventh of the present invention is an image forming apparatus which senses a magnetic material by detecting a signal which the magnetic material emits when an alternating magnetic field is applied, the image forming apparatus includes: an exciting coil which applies the alternating magnetic field; a receiving coil which receives a first signal which is generated due to the alternating magnetic field; a noise signal removing part that removes, from the first signal, a noise signal of an object which reflects the alternating magnetic field; and a detecting part that detects, from the noise signal-removed signal, the signal emitted from the magnetic material.

A twelfth aspect of the present invention is the image forming apparatus according to the eleventh aspect of the invention, in which the noise signal removing part may include a rectification part that rectifies the first signal and a DC signal removing part that removes a DC signal from the rectified first signal.

A thirteenth aspect of the present invention is the image forming apparatus according to the eleventh aspect of the invention, in which the noise signal removing part may include a rectification part that rectifies the first signal, a DC signal extracting part that extracts a DC signal from the rectified first signal, and a DC signal removing part that differentially amplifies the extracted DC signal and the rectified first signal to cancel the DC signal contained in the rectified first signal.

A fourteenth aspect of the present invention is the image forming apparatus according to the twelfth aspect of the invention, in which the detecting part may detect the signal emitted from the magnetic material by detecting that the noise signal-removed signal exceeds a value.

A fifteenth aspect of the present invention is the image forming apparatus according to the thirteenth aspect of the invention, in which the detecting part may detect the signal emitted from the magnetic material by detecting that the noise signal-removed signal exceeds a value.

A sixteenth aspect of the present invention is the image forming apparatus according to the eleventh aspect of the invention, which may not perform a copy operation when the magnetic material is detected.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-42676 filed on Feb. 18, 2005 including specification, claims, drawings and abstract is incorporated herein by reference in its entirety.

What is claimed is:

1. A magnetic material sensing device which senses a magnetic material by detecting a signal which the magnetic material emits when an alternating magnetic field is applied, the magnetic material sensing device comprising:
    an exciting coil which applies the alternating magnetic field;
    a receiving coil which receives a first signal which is emitted by the magnetic material due to the alternating magnetic field;
    a noise signal removing part that removes, from the first signal, a noise signal of an object which reflects the alternating magnetic field; and
    a detecting part that detects, from the noise signal-removed signal, the signal emitted from the magnetic material.

2. The magnetic material sensing device according to claim 1, wherein the noise signal removing part comprises:
    a rectification part that rectifies the first signal; and
    a DC signal removing part that removes a DC signal from the rectified first signal.

3. The magnetic material sensing device according to claim 1, wherein the noise signal removing part comprises:
    a rectification part that rectifies the first signal;
    a DC signal extracting part that extracts a DC signal from the rectified first signal; and
    a DC signal removing part that differentially amplifies the extracted DC signal and the rectified first signal to cancel the DC signal contained in the rectified first signal.

4. The magnetic material sensing device according to claim 2, wherein the detecting part detects the signal emitted from the magnetic material by detecting that the noise signal-removed signal exceeds a value.

5. The magnetic material sensing device according to claim 3, wherein the detecting part detects the signal emitted from the magnetic material by detecting that the noise signal-removed signal exceeds a value.

6. A magnetic material sensing method for sensing a magnetic material by detecting a signal which the magnetic material emits when an alternating magnetic field is applied, the magnetic material sensing method comprising:
    applying the alternating magnetic field;
    receiving a first signal which is emitted by the magnetic material due to the alternating magnetic field;
    removing, from the first signal, a noise signal of an object which reflects the alternating magnetic field; and
    detecting, from the noise signal-removed signal, the signal emitted from the magnetic material.

7. The magnetic material sensing method according to claim 6, wherein removing the noise signal from the first signal includes:

rectifying the first signal; and removing a DC signal from the rectified first signal.

8. The magnetic material sensing method according to claim 6, wherein removing the noise signal from the first signal includes:

rectifying the first signal;

extracting a DC signal from the rectified first signal; and differentially amplifying the extracted DC signal and the rectified first signal to cancel the DC signal contained in the rectified first signal.

9. The magnetic material sensing method according to claim 7, wherein detecting the magnetic material is performed by detecting that the noise signal-removed signal exceeds a value.

10. The magnetic material sensing method according to claim 8, wherein detecting the magnetic material is performed by detecting that the noise signal-removed signal exceeds a value.

11. An image forming apparatus which senses a magnetic material by detecting a signal which the magnetic material emits when an alternating magnetic field is applied, the image forming apparatus comprising:

an exciting coil which applies the alternating magnetic field;

a receiving coil which receives a first signal which is emitted by the magnetic material due to the alternating magnetic field;

a noise signal removing part that removes, from the first signal, a noise signal of an object which reflects the alternating magnetic field; and a detecting part that detects, from the noise signal-removed signal, the signal emitted from the magnetic material.

12. The image forming apparatus according to claim 11, wherein the noise signal removing part comprises:

a rectification part that rectifies the first signal; and a DC signal removing part that removes a DC signal from the rectified first signal.

13. The image forming apparatus according to claim 11, wherein the noise signal removing part comprises:

a rectification part that rectifies the first signal;

a DC signal extracting part that extracts a DC signal from the rectified first signal; and a DC signal removing part that differentially amplifies the extracted DC signal and the rectified first signal to cancel the DC signal contained in the rectified first signal.

14. The image forming apparatus according to claim 12, wherein the detecting part detects the signal emitted from the magnetic material by detecting that the noise signal-removed signal exceeds a value.

15. The image forming apparatus according to claim 13, wherein the detecting part detects the signal emitted from the magnetic material by detecting that the noise signal-removed signal exceeds a value.

16. The image forming apparatus according to claim 11, which does not perform a copy operation when the magnetic material is detected.

* * * * *